US012599265B2

(12) United States Patent
Escalier et al.

(10) Patent No.: US 12,599,265 B2
(45) Date of Patent: Apr. 14, 2026

(54) BEVERAGE MACHINE WITH SEPARABLE FLUID MODULE

(71) Applicant: SOCIETE DES PRODUITS NESTLE S.A., Vevey (CH)

(72) Inventors: Thibault Escalier, Montlebon (FR); Alexandre Perentes, Sullens (CH); Alexandre Pugliese, Paudex (CH)

(73) Assignee: Societe des Produits Nestle S.A., Vevey (CH)

( * ) Notice: Subject to any disclaimer, the term of this patent is extended or adjusted under 35 U.S.C. 154(b) by 946 days.

(21) Appl. No.: 17/757,398

(22) PCT Filed: Dec. 15, 2020

(86) PCT No.: PCT/EP2020/086070
§ 371 (c)(1),
(2) Date: Jun. 15, 2022

(87) PCT Pub. No.: WO2021/122499
PCT Pub. Date: Jun. 24, 2021

(65) Prior Publication Data
US 2023/0036537 A1 Feb. 2, 2023

(30) Foreign Application Priority Data

Dec. 16, 2019 (EP) .................................... 19216357

(51) Int. Cl.
*A47J 31/22* (2006.01)
*A47J 31/06* (2006.01)
(Continued)

(52) U.S. Cl.
CPC ........... *A47J 31/22* (2013.01); *A47J 31/0673* (2013.01); *A47J 31/407* (2013.01); *A47J 31/3695* (2013.01)

(58) Field of Classification Search
CPC .... A47J 31/22; A47J 31/0673; A47J 31/3628; A47J 31/3695
(Continued)

(56) References Cited

U.S. PATENT DOCUMENTS 9,675,202 B2 * 6/2017 Perentes ............. A47J 31/0673
9,775,463 B2 * 10/2017 Jarisch .................... A47J 31/22
(Continued)

FOREIGN PATENT DOCUMENTS

CN 101686770 A 3/2010
EP 2119383 A1 * 11/2009 .............. A47J 31/22
(Continued)

OTHER PUBLICATIONS

Chinese Office Action for App. No. 202080081746.3 dated Feb. 14, 2025 (13 pages).

*Primary Examiner* — Reginald Alexander
(74) *Attorney, Agent, or Firm* — K&L Gates LLP

(57) ABSTRACT

A machine (1) for preparing a beverage has a beverage processing unit (10,20) formed of a first processing unit member (10) and a second processing unit member (20) that delimit a chamber (21) and that are movable between a distant configuration in which the ingredient (2) is received in the chamber (21) and a proximate configuration in which the ingredient (2) is held and mixed with the water (4) in the chamber (21). The machine includes: a water source for delivering the water (4) towards the beverage processing unit (10,20); and a fluid module (15) having a water guide (30) for guiding the water (4) between the water source and the chamber (21), the fluid module (15) comprising the first processing unit member (10) of the processing unit (10,20). The fluid module (15) is assemblable by a user as a unit to the water source and to the second processing unit member (Continued)

(20) and is disassemblable by a user as a unit from the water source and from the second processing unit member (20).

18 Claims, 4 Drawing Sheets

(51) Int. Cl.
    *A47J 31/40*         (2006.01)
    *A47J 31/36*         (2006.01)

(58) Field of Classification Search
    USPC ........................................................ 99/302 C
    See application file for complete search history.

(56)               References Cited

U.S. PATENT DOCUMENTS

| | | | |
|---|---|---|---|
| 9,980,595 B2 * | 5/2018 | Jarisch | .................... A47J 31/22 |
| 2008/0302249 A1 | 12/2008 | Lin | |
| 2015/0230493 A1 * | 8/2015 | Rodriguez Rodriguez | ................. A23F 5/36 426/77 |
| 2015/0320254 A1 | 11/2015 | Perentes et al. | |
| 2016/0367069 A1 | 12/2016 | Cable et al. | |
| 2021/0052104 A1 * | 2/2021 | Perentes | ................. A47J 31/22 |

FOREIGN PATENT DOCUMENTS

| | | |
|---|---|---|
| EP | 2893855 A1 | 7/2015 |
| FR | 2487661 | 2/1982 |

* cited by examiner

Fig. 5
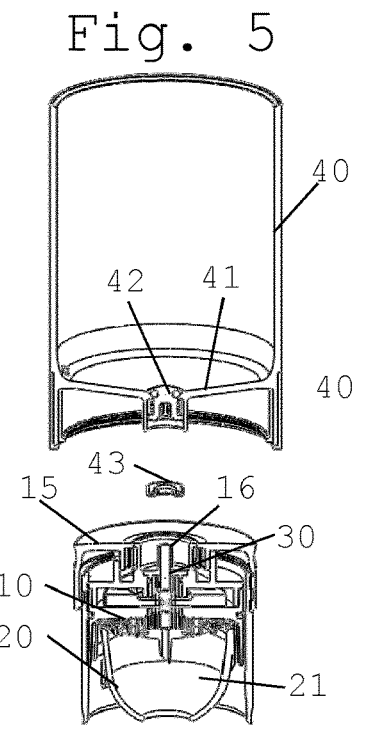
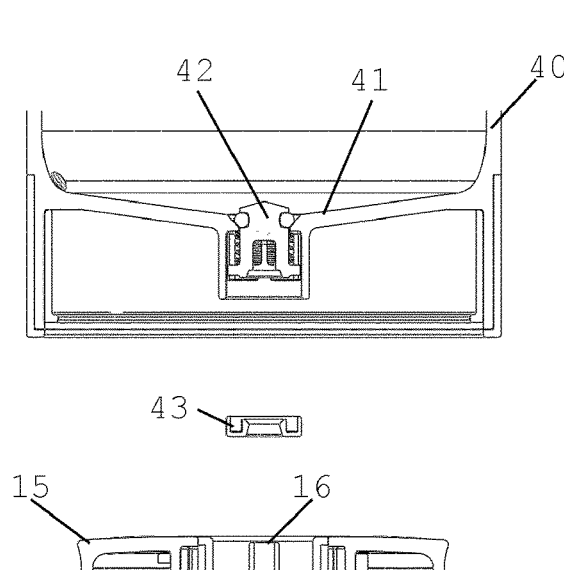
Fig. 6
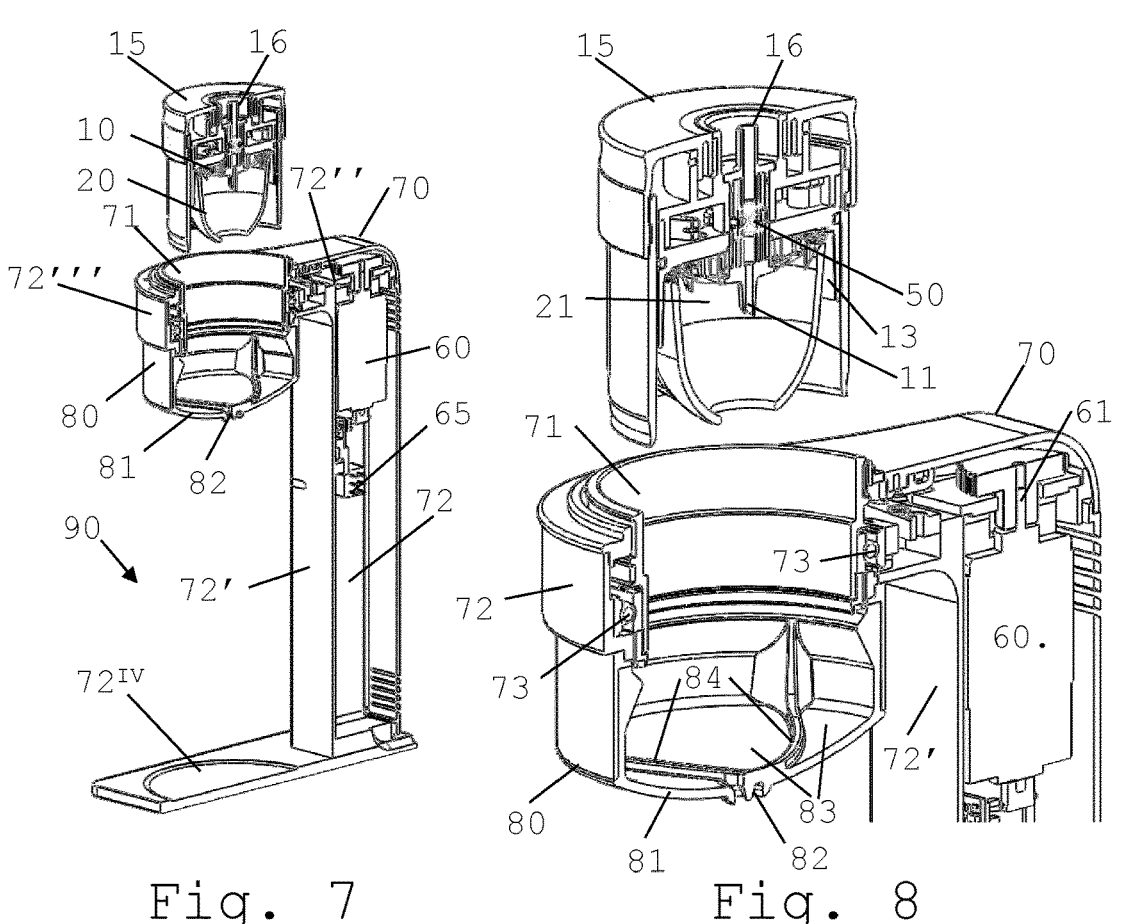
Fig. 7          Fig. 8

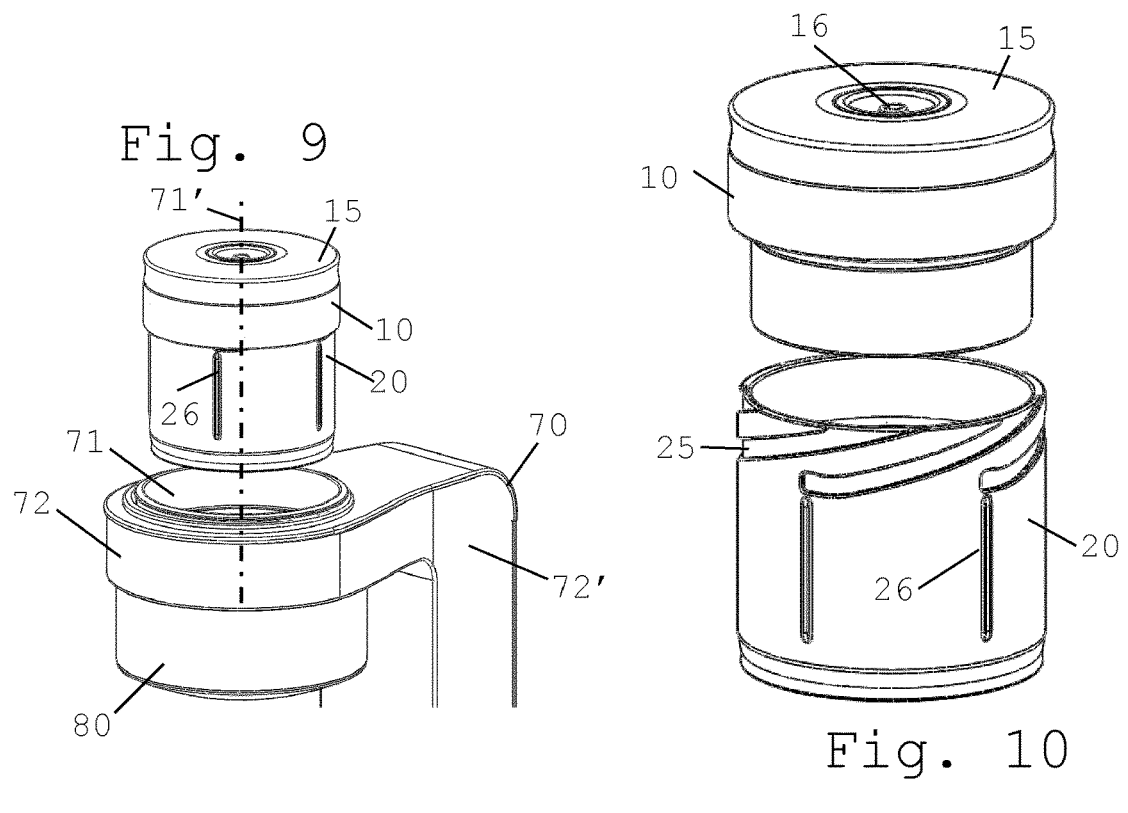
Fig. 9
Fig. 10
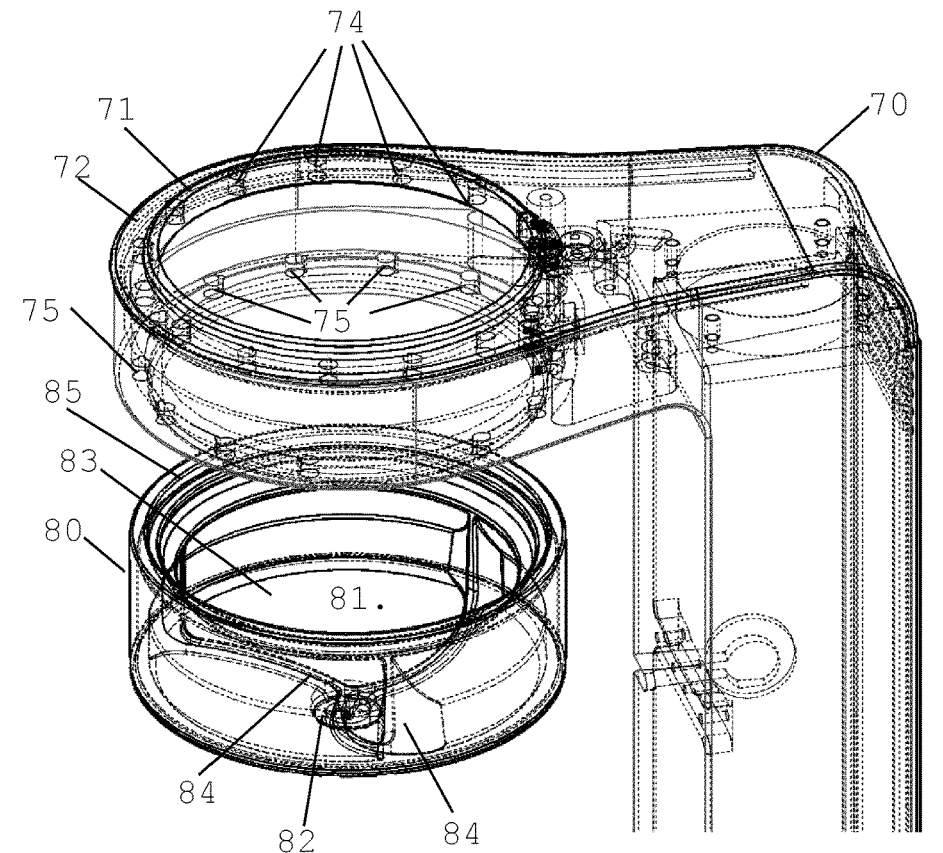
Fig. 11

BEVERAGE MACHINE WITH SEPARABLE FLUID MODULE

CROSS REFERENCE TO RELATED APPLICATIONS

The present application is a National Stage of International Application No. PCT/EP2020/086070, filed on Dec. 15, 2020, which claims priority to European Patent Application No. 19216357.4, filed on Dec. 16, 2019, the entire contents of which are being incorporated herein by reference.

FIELD OF THE INVENTION

The field of the invention pertains to beverage preparation machines which uses liquid in the preparation of the beverage. The liquid is typically water or water-based. The machine may be configured to prepare the beverage by passing the liquid through an ingredient of the beverage to be prepared, such as at least one of coffee, tea, cacao, milk, sugar and/or soup ingredient. The ingredient may be supplied within a capsule into the machine. For instance, the liquid is mixed with the ingredient contained in the capsule by centrifuging the capsule while the liquid is passed through the capsule.

For the purpose of the present description, a "beverage" is meant to include any human-consumable liquid substance, such as tea, coffee, chocolate, milk, soup, baby food, etc. .
. . . A "capsule" is meant to include any container such as a packaging for containing a pre-portioned beverage ingredient, e.g. a flavouring ingredient, the packaging forming an enclosure of any material, in particular an airtight or pervious material, porous or non-porous material, e.g. plastic, aluminium, recyclable and/or biodegradable packagings, and of any shape and structure, including soft pods or rigid cartridges for containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Various outside machine configurations have been proposed to handle the machine, as for instance disclosed in WO 2009/074553, WO 2010/003932, WO 2010/015427, WO 2010/037806, WO 2011/144720, WO 2012/055765, WO 2012/093107, WO 2012/126971, WO 2013/037781, WO 2013/037782, WO 2013/037783, WO 2013/127906, WO 2015/140091, WO 2016/083484, WO 2016/156364, WO 2016/156372, WO 2017/037215 and WO 2018/219985.

Especially in the field of coffee preparation, machines have been widely developed in which a capsule containing beverage ingredients is inserted in a brewing device. The brewing device is closed about the capsule, water is injected, the beverage is produced in the closed volume of the capsule and a brewed beverage can be drained from the capsule and collected into a receptacle such as a cup or glass.

Heat management in such systems is known from EP 2393404 A1, WO 2010/089329 and in WO 2014/090850. It is also known to interrupt or reduce the powering of the thermal conditioner of a beverage machine to reduce the powering consumption of the machine when not in the process of delivering a beverage, e.g. as disclosed in WO 2011/020779 and WO 2012/007260, or to interrupt or reduce the powering of the thermal conditioner to stop or reduce the thermal conditioning of beverage ingredients in the preparation of the beverage, e.g. as disclosed in EP19181432.6. It is possible to bypass a thermal conditioner to process thermally unconditioned water for a desired beverage preparation, e.g. as disclosed in WO 2018/158179. It is also known to drive, e.g. using a pump, water through such systems, for instance as disclosed in WO 2004/014205, WO 2006/005425, WO 2009/024500, WO 2009/150030, WO 2010/108700, WO 2011/107574 and WO 2018/001750.

The preparation of a beverage by using centrifugation is known. Such beverage preparation includes: providing a beverage (flavoring) ingredient, e.g. as powder and/or leaves, in a capsule; circulating liquid into the capsule and rotating the capsule at sufficient speed to ensure interaction of the liquid with the ingredient while creating a gradient of pressure of liquid in the capsule. Such pressure increases gradually from the center towards the periphery of the capsule. As liquid passes through the ingredient, e.g. coffee bed, extraction of the ingredient, e.g. coffee compounds, takes place and a liquid extract is obtained that flows out at the periphery of the capsule. Examples of such systems are disclosed in WO 2008/148601, WO 2013/007776, WO 2013/007779, WO 2013/007780, WO 2013/007781, WO 2015/173123, WO 2017/202746 and WO 2017/046294.

SUMMARY OF THE INVENTION

The invention relates to a machine for preparing a beverage from at least one ingredient. Normally such beverage is then dispensed to a user, e.g. to a user-cup or user-mug.

The machine is arranged for preparing a beverage from a flavouring ingredient, e.g. coffee or tea or chocolate or cacao or milk or soup, by mixing water with the flavouring ingredient, e.g. by centrifugally driving such flavouring ingredient with water.

For instance, the machine incorporates features disclosed in WO 2008/148604, WO 2009/106598, WO 2014/096122, WO 2010/026053 or WO 2014/096123.

The beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 15 to 1000 ml such as 25 to 600 ml for instance 40 to 250 ml, e.g. the volume for filling a cup or mug, depending on the type of beverage. Formed and dispensed beverages may be selected from cold and warm beverages, for example from cold brewed tea or coffee, or warm/hot brewed tea or coffee, e.g. ristrettos, espressos, lungos, cappuccinos, café latte, americano coffees, teas, etc. . . . . For example, a coffee machine may be configured for dispensing coffee, e.g. an adjustable volume of 20 to 60 ml per serving, and/or for dispensing lungos, e.g. a volume in the range of 70 to 200 ml per serving, and/or for dispensing americanos, e.g. a volume in the range of 150 to 750 ml.

The machine includes a beverage processing unit formed of a first processing unit member and a second processing unit member that delimit a chamber and that are movable between a distant configuration in which the flavouring ingredient is received in the chamber and a proximate configuration in which the flavouring ingredient is held and mixed with the water in the chamber during beverage preparation. For instance, the flavouring ingredient can be supplied into the chamber within a capsule, e.g. with a capsule flange.

Typically, the chamber is provided or associated with an inlet arrangement and/or an outlet arrangement. Examples of inlet arrangements are disclosed in WO 2010/063644. Examples of outlet arrangements are disclosed in WO 2009/106175, WO 2012/100836, WO 2013/020939 and WO 2017/068134.

The beverage processing unit, typically of the centrifugal type, may incorporate features disclosed in EP 2 000 062, EP 2 155 020, EP 2 152 128, WO 2008/148646, WO 2009/106175, WO 2010/026045, WO 2010/063644, WO 2010/066705 and WO 2010/066736.

The beverage processing unit (when using ingredient capsules) may be fitted with an arrangement for opening the capsule, e.g. as disclosed in WO 2008/148656, WO 2010/026045 and WO 2010/066736.

The beverage processing unit members may be secured together in their proximate position by a corresponding arrangement, e.g. as disclosed in WO 2012/007293 and WO 2014/102048.

The capsule may have a body containing an ingredient and a peripherally projecting flange. The capsule may be of the type described above under the header "field of the invention". The capsule may be a capsule that has a container-body, e.g. a generally cup-shaped or hemispherical or hemi-ellipsoidal body, having a flange to which a cover lid is attached, in particular sealed. Typically, the capsule contains a beverage ingredient.

The capsule may have a or the above body that is symmetric or asymmetric, conical or frusto-conical, pyramidal or frusto-pyramidal, cylindrical or prismatic, spherical or hemispherical or frusto-spherical, domical or frusto-domical, containing the ingredient.

The capsules (when the machine is intended to be operated with capsules, e.g. capsules of different sizes) may incorporate the features disclosed in WO 2008/148650, WO 2008/148834 and WO 2011/023711.

An automatic capsule recognition system, for instance an arrangement configured to read an identification device, e.g. a code, borne by the capsule such as a bar code e.g. a rotationally readable bar code, may be used to parameterize and adjust the processing of the flavouring ingredient contained in the above mentioned capsule automatically in line with the type of ingredient, e.g. a profile of an extraction flow (e.g. speed and/or pressure) and/or extraction temperature. Examples of such technologies and associated features are disclosed in WO2011/141532, WO2011/141535, WO 2012/010470, WO 2013/072239, WO 2013/072297, WO 2013/072326, WO 2013/072351 and WO 2015/044400.

The machine has a water source for delivering the water towards the beverage processing unit, such as a connector to be connected to a water supply line external to such machine and/or a water supply tank that has an outside opening for water filling with a water source external to such machine.

The machine can have a control device, such as a control device comprising a controller and/or processor, configured to control the delivery of water to the processing unit. Other functions may be controlled by the control device, e.g. automatic ingredient detection and/or sensing and/or capsule recognition system, water availability at the water source, etc . . . .

The control device may be associated with a selection arrangement, e.g. a selection arrangement comprising a user-interface and/or a flavouring ingredient sensor and/or capsule recognition system, for selecting one of several available beverage preparation modes. Examples of user-interfaces are disclosed in WO 2015/096998.

The selection arrangement may be configured to initiate and/or stop a beverage preparation and/or to select a particular volume of water of a plurality of selectable available volumes to be supplied to the beverage processing unit's chamber for preparing a correspondingly resulting particular volume of the beverage and/or, when the machine is configured accordingly, to select a centrifugal speed profile of the chamber during beverage preparation.

The machine has a fluid module including a water guide for guiding the water between the water source and the chamber. The fluid module comprises the first processing unit member of the processing unit. The water guide may be free of a water pump or may comprise a water pump, such as a gear or a peristaltic or a piston, e.g. solenoid, or a diaphragm pump.

The water supply tank, when present, may have: a resilient valve with a biased gate that is opened by actuation by a tank seat, and/or by a fluid connector of the water guide; and/or an arrangement for mechanical and/or magnetic user-reversible assembly to a or the above mentioned tank seat.

The first processing unit member may delimit a water inlet of the chamber or delimit a beverage outlet out of the chamber or delimit both such inlet and outlet. The inlet may form an extremity of the water guide. For example, the inlet and/or outlet are formed by and/or associated with one or more corresponding piercing elements for piercing the capsule (when present).

The fluid module is assemblable by a user as a unit to the water source and to the second processing unit member and is disassemblable by a user as a unit from the water source and from the second processing unit member. The fluid module may be assemblable to and disassemblable from the water source and the second processing unit member along an upright direction of assembly and disassembly, such as a downward direction of assembly and an upward direction of disassembly of the fluid module to the second processing unit member (20) and/or an upward direction of assembly and a downward direction of disassembly of the fluid module to the water source.

Assemblable and disassemblable "as a unit" means that all the different parts of the fluid module can be preassembled prior to assembly to the water source and to the second processing unit and that these different parts can remain assembled together when separated as a whole from the water source and from the second processing unit. Hence, sequential handling of the different parts of the fluid module during assembly to and disassembly from the water source and the second processing unit can be avoided.

Hence, the fluid line may be removed from the machine by a user, for instance for servicing, e.g. cleaning, and/or for replacement.

The fluid module and the second processing unit member can be disassemblably assembled together by at least one of a bayonet, screw-type, a hook-type, magnet-type, friction-type and latch-type connection.

The machine typically includes a supporting structure which has a base that is stationary during beverage preparation. The module may be mountable by a user as a unit to the supporting structure and removable by a user as a unit from the supporting structure. The above observations regarding the assembly and disassembly "as a unit" apply mutatis mutandis.

The water source can be: mountable by a user as a unit to the supporting structure and removable by a user as a unit therefrom; and/or pluggable by a user to a or the above mentioned fluid connector that is at an extremity of the water guide to fluidically connect the water source to the water guide, and unpluggable by a user therefrom.

The fluid module, for example with the second processing unit member, may be configured to be driven in rotation by an actuator typically an electric actuator, such as a motor e.g. an electric motor, during beverage preparation so as to mix the water with the flavouring ingredient in the chamber e.g. by centrifugation. For example, the motor is a hollow shaft motor surrounding part of the fluid module and/or of the chamber or a solid shaft motor.

The water guide may have at an extremity a or the above mentioned fluid connector that is fluidically coupled to the water source via a seal.

For instance, the water source is stationary during beverage preparation and the seal is either: angularly fixed to the water source and slidingly mounted to the rotating fluid connector; or angularly fixed to the rotating fluid connector and slidingly mounted to the water source; or slidingly mounted to the rotating fluid connector and slidingly mounted to the water source.

The fluid module may include a valve arrangement for controlling, such as interrupting or allowing, a flow of the water along the water guide. The valve arrangement can be directly or indirectly rotatably mounted relative to the water source and driven in rotation at a rotational speed by the actuator to control the flow of the water along the water guide. For instance, the valve arrangement is configured to interrupt the flow of the water along the water guide when not driven in rotation and is configured to allow the flow of the water along the water guide when driven in rotation. For instance, the valve arrangement is configured to interrupt the flow of the water along the water guide when its rotational speed is below a threshold speed and is configured to allow the flow of the water along the water guide when its rotational speed is above the threshold speed.

One of the processing unit members can be provided with a cavity delimiting the chamber, the first and second processing unit members in their distant configuration being configured for direct manual insertion into, and optionally direct manual removal out of, the cavity of the flavouring ingredient, optionally provided within the capsule. For instance, the cavity-provided unit member is configured to be able to be oriented upwards for insertion of the flavouring ingredient into the cavity and to be oriented downwards (e.g. turned upside-down) for removal of the flavouring ingredient out of the cavity, e.g. with the aid of gravity. By implementing such a simple optional configuration, the machine does not need to incorporate an ingredient transfer arrangement for inserting into and/or removing from the cavity the flavouring ingredient before and/or after beverage preparation.

The machine (when using ingredient capsules) may however have a capsule transfer device, e.g. as disclosed in WO 2012/041605, WO 2017/046294 and WO 2017/202746.

The water source, e.g. a or the above mentioned water supply tank, can be configured to contain a limited amount of water that corresponds to a maximum amount needed for a serving. The machine may be configured to deliver all the water contained in the water source for preparing a serving of the beverage. The limited amount of water can be in the range of 200 to 1000 ml, such as 350 to 750 ml. The water source may include an indication arrangement, such as a marking system on the water supply tank, to indicate different levels of water amounts below the maximum amount corresponding to different types of beverage servings. By implementing such a single optional configuration, the machine does not need to incorporate an active control arrangement to manage the volume of water required for a serving, it being sufficient that the user provides the water source only with the required amount for the desired serving and that the water is driven to the processing unit until the entire amount of water from the water source is used up.

The machine may be configured to prepare the beverage: without thermally conditioning the water delivered from the water source into the chamber, for instance the machine being free of activatable thermal conditioner or having a beverage preparation mode in which a thermal conditioner is bypassed or inactivated; or with thermally conditioning the water delivered from the water source into the chamber, for instance the machine having an activatable thermal conditioner such as a water heater and/or cooler.

It is also possible to provide thermally pre-conditioned water in the water source, e.g. heat and/or cool the water prior to supplying into to the machine.

The machine may be configured to deliver the beverage at a temperature below 30° C. such as below 25° C., for instance in the range of 3 to 20° C., for example in the range of 5 to 15° C., e.g. 7 to 10° C. The machine may deliver the beverage at room temperature.

The machine can be configured to deliver the water from the water source into the chamber at an average rate for a beverage serving in the range of 10 to 300 ml/min, for instance 20 to 100 ml/min, such as 40 to 80 ml/min. For example, the instantaneous rate of water delivery is lower or close to zero or even zero towards the beginning of beverage preparation, e.g. for pre-wetting the flavouring ingredient, and is higher towards the end of beverage preparation.

The beverage processing unit may be arranged in order to rotate the chamber at a speed in the range of 500 to 10000 RPM, such as 1250 to 7500 RPM, for centrifugation of the water with the flavouring ingredient, for instance within the above mentioned capsule, to prepare the beverage.

The invention also relates to a combination of a machine as described above and a flavouring ingredient, e.g. a flavouring ingredient contained in a capsule, for preparing a beverage from the flavouring ingredient in the machine.

A further aspect of the invention relates to a method of preparing a beverage by mixing water with a flavouring ingredient, e.g. a flavouring ingredient contained in a capsule, in a machine as described above.

Another aspect of the invention relates to a use of a flavouring ingredient, e.g. a flavouring ingredient contained in a capsule, for mixing with water, e.g. by centrifugally driving such flavouring ingredient with water, in a machine as described above.

Within the context of the present disclosure, the fact that an operation can be done by a user means that no special tool or special knowledge unavailable to ordinary users is required to do such operation. Normally such operation should not involve any destruction of any part of the machine.

BRIEF DESCRIPTION OF THE DRAWINGS

The invention will now be described with reference to the schematic drawings, wherein:

FIG. 5 shows a perspective cross-sectional view of part of the machine of FIG. 1 with a disconnected water source;

FIG. 6 is a cross-sectional view part of the machine of FIG. 1 illustrating the connection of the water source;

FIGS. 7 and 8 are cross-sectional perspective views of the machine of FIG. 1 illustrating the assembly of the beverage processing unit, FIG. 8 being an enlarged view of part of FIG. 7;

FIG. 9 is a perspective view of the machine of FIG. 1 illustrating the assembly of the beverage processing unit;

FIG. 10 shows is a perspective view of the beverage processing unit of the machine of FIG. 1 with first and second members in a distant configuration;

FIG. 11 illustrates a support structure of the machine of FIG. 1 with an assembly arrangement for the fluid line;

DETAILED DESCRIPTION

Figures 1, 2, 3, 4:
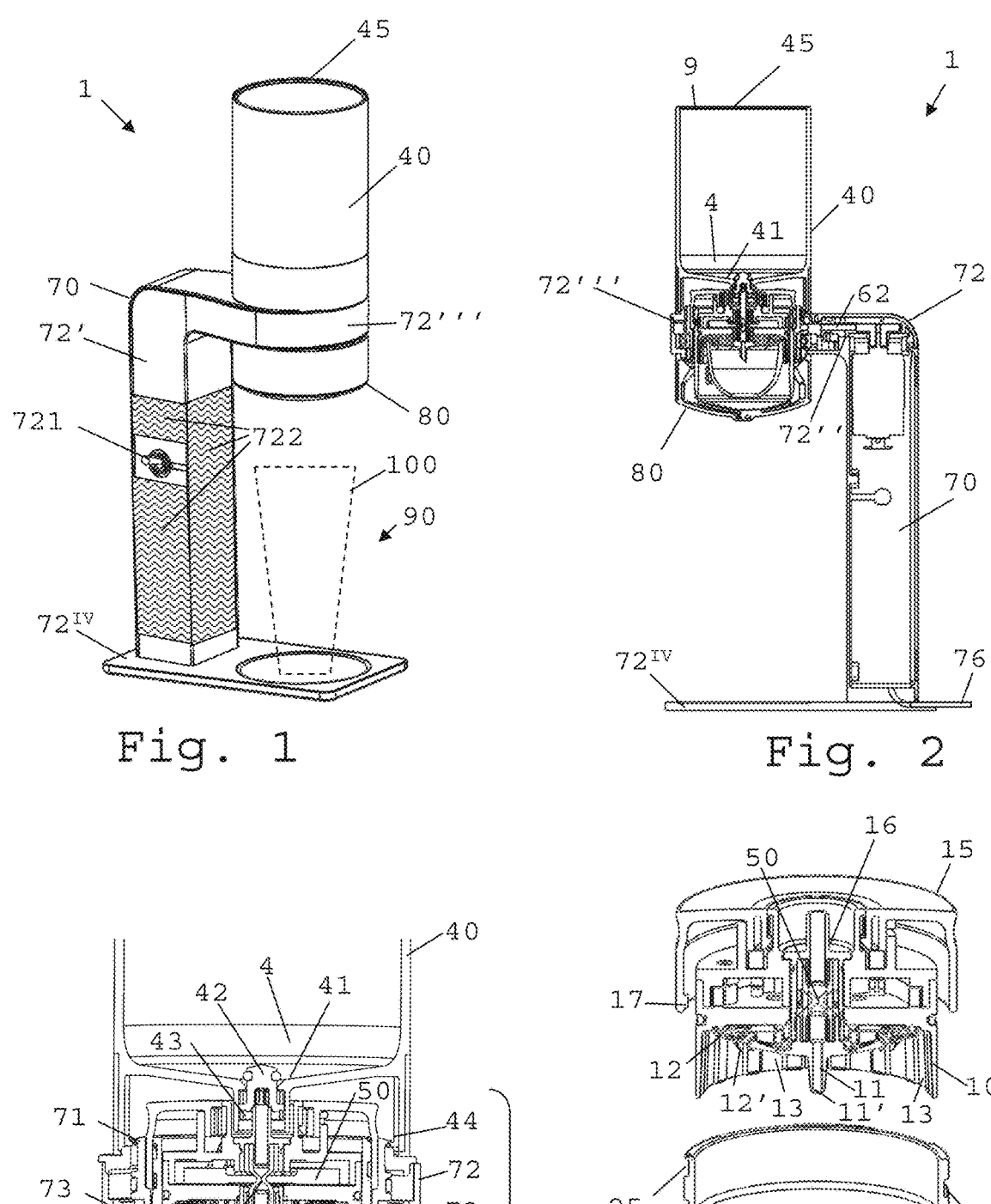
FIG. 1 is a perspective view of part of a machine according to the invention.
FIG. 2 is a cross-sectional view of the machine of FIG. 1.
FIG. 3 is a cross-sectional view of a fluid line of part of the machine of FIG. 1 with a beverage processing unit.
FIG. 4 shows a perspective cross-sectional view of part of the machine of FIG. 1, the beverage processing unit being made of first and second members in a distant configuration.
Figures 12, 13, 14, 15, 16:
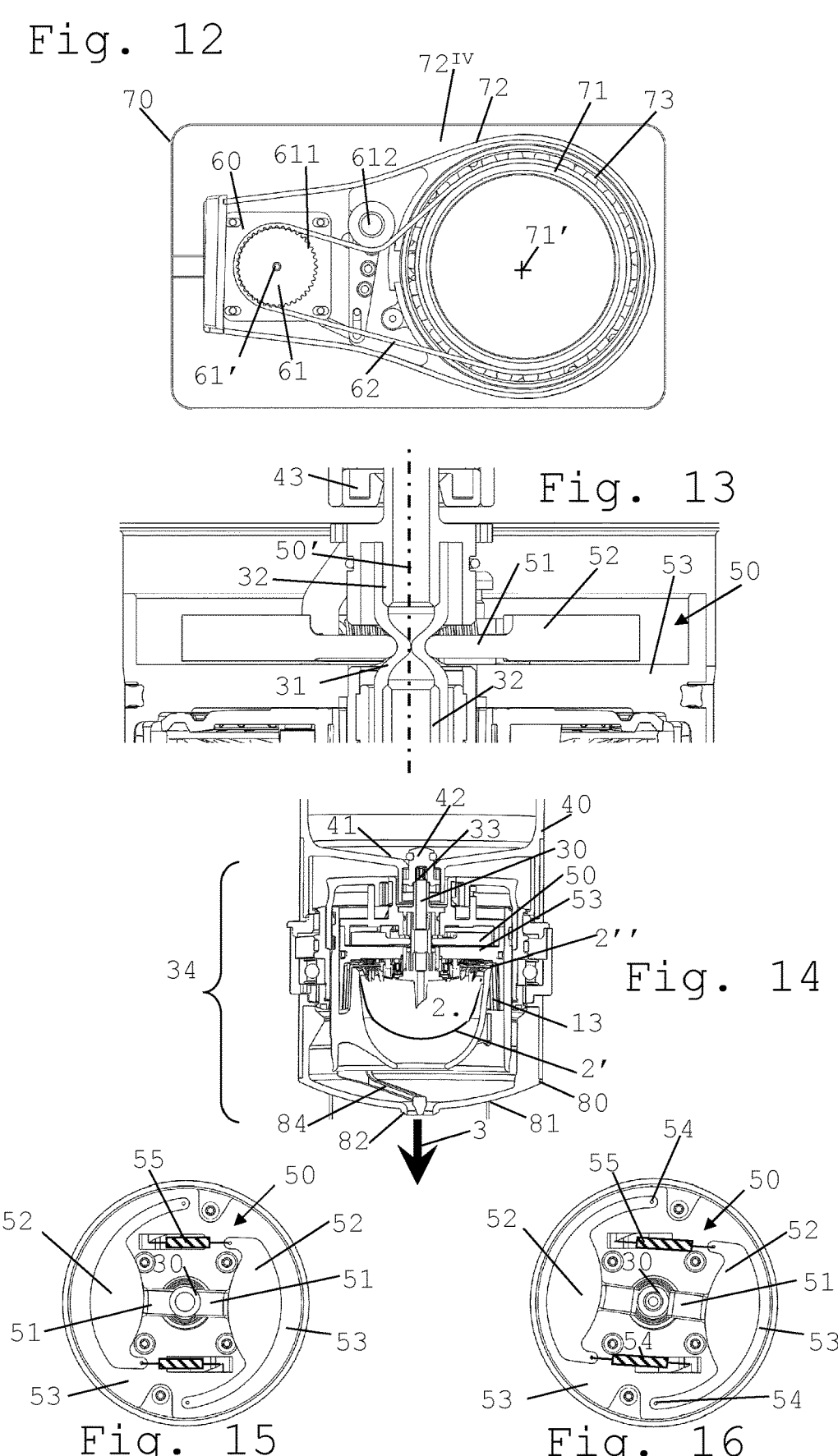
FIG. 12 is a cross-sectional view from above of the machine of FIG. 1.
FIG. 13 is a cross-sectional view of a valve arrangement in the fluid line of the machine of FIG. 1.
FIG. 14 is a cross-sectional view of the beverage processing unit of the machine of FIG. 1 during beverage preparation.
FIGS. 15 and 16 are cross-sectional views from above of a valve arrangement, e.g. for the machine of FIG. 1, interrupting and allowing, respectively, a water flow.

FIGS. 1 to 16, in which the same numeric references generally designate the same parts, illustrate an exemplary embodiment of a machine 1 and parts thereof in accordance with the invention.

Machine 1 is configured for preparing a beverage 3 from a flavouring ingredient 2, e.g. coffee or tea or chocolate or cacao or milk or soup, by mixing water 4 with the flavouring ingredient, e.g. by centrifugally driving such flavouring ingredient with water 4.

Machine 1 includes a beverage processing unit 10, 20 formed of a first processing unit member 10 and a second processing unit member 20, such as a substantially lid-shaped or plug-shaped first member 10 and a cooperating substantially cup- or chalice-shaped second member 20, that delimit a chamber 21 and that are movable between a distant configuration in which flavouring ingredient 2 is received in chamber 21 and a proximate configuration in which flavouring ingredient 2 is held and mixed with water 4 in chamber 21 during beverage preparation. Flavouring ingredient 2 may be supplied into chamber 21 within a capsule 2' e.g. with a capsule flange 2".

Machine 1 has a water source for delivering water 4 towards beverage processing unit 10,20, such as a connector 9 to be connected to a water supply line external to machine 1 and/or a water supply tank 40 that has an outside opening 45 for water filling with a water source external to such machine 1.

Machine 1 is provided with a water guide 30 for guiding water 4 between the water source and chamber 21. Water guide 30 may be free of a water pump or may comprise a water pump, such as a gear or a peristaltic or a piston, e.g. solenoid, or a diaphragm pump.

Machine 1 may include a valve arrangement 50 for controlling, such as interrupting or allowing, a flow of water 4 along water guide 30.

Machine 1 can have an actuator typically an electric actuator, such as a motor e.g. an electric motor 60, for actuating valve arrangement 50 to control the water flow along water guide 30. For example, motor 60 is a hollow shaft motor surrounding part of the valve arrangement or a solid shaft motor.

Machine 1 may have a support structure 70, such as a frame, which has a base 72 that is stationary during beverage preparation and that supports at least the valve arrangement 50.

Water supply tank 40, when present, may have: a resilient valve with a biased gate 42 that is opened by actuation by a part of base 72 (when present) and/or by a tank seat 72 and/or by a fluid connector 16 of water guide 30; and/or an arrangement for mechanical and/or magnetic user-reversible assembly 44, 74 to base 72 and/or a tank seat 72.

Water guide 30 and valve arrangement 50 may be arranged such as to fluidically connect the water source and beverage processing unit 10, 20 and to control the flow of water 4 from the water source into chamber 21.

First processing unit member 10 may delimit a water inlet 11 of chamber 21 or may delimit a beverage outlet 12 out of chamber 21 or may delimit both such inlet 11 and outlet 12, inlet 11 forming an extremity of water guide 30, e.g. inlet 11 and/or outlet 12 being formed by and/or associated with one or more corresponding piercing elements 11', 12' for piercing above mentioned capsule 2'.

Valve arrangement 50, when present, may be directly or indirectly rotatably mounted to support structure 70 and driven in rotation at a rotational speed by the actuator to control the flow of water 4 along water guide 30. Valve arrangement 50 may be configured to interrupt the flow of water 4 along water guide 30 when not driven in rotation and is configured to allow the flow of water 4 along water guide 30 when driven in rotation. Valve arrangement 50 can be configured to interrupt the flow of water 4 along water guide 30 when its rotational speed is below a threshold speed and is configured to allow the flow of water 4 along water guide 30 when its rotational speed is above the threshold speed.

Processing unit 10, 20 may be configured to be driven in rotation by a or the above mentioned actuator, typically an electric actuator, such as a motor e.g. an electric motor 60, so as to mix water 4 with flavouring ingredient 2 in chamber 21, e.g. by centrifugation. For example, motor 60 is a hollow shaft motor surrounding part of the processing unit or a solid shaft motor.

Valve arrangement 50 can be rotationally fixed to processing unit 10, 20 or processing unit 10, 20 can be driven by the actuator such that processing unit 10, 20 and valve arrangement 50 have a constant speed ratio. For instance, valve arrangement 50 is fixed to first processing unit member 10.

Valve arrangement 50 and processing unit 10, 20 may be driven in rotation about parallel or collinear axis 50' or about intersecting or skew axis.

Valve arrangement 50 may include a rotational speed sensor 52 connected to a valve gate 51 that is configured to act on the water flow and/or on water guide 30 to control the water flow therealong. Rotational speed sensor 52 can be configured to be moved away or towards an axis 50' of rotation of valve arrangement 50 by rotating valve arrangement 50.

Valve arrangement 50 may include an automatic return device, e.g. a return spring 55 or a return magnet, for automatically returning, or assisting a return of, rotational speed sensor 52 towards or away axis 50' of rotation.

Gate 51 can be fixed to or integral with rotational speed sensor 52 or can be actuated by rotational speed sensor 52.

Rotational speed sensor 52 may form an inertia mass.

Rotational speed sensor 52 may be sensitive to a direction of rotation.

Valve arrangement 50 may include a valve support 53 that is rotationally driven by the actuator, e.g. a or the above-mentioned motor 60, at least one of rotational speed sensor 52 and valve gate 51 being movably mounted to valve support 53, such as pivotally and/or linearly mounted to valve support 53, e.g. pivotally mounted at a pivoting axis 54.

Water guide 30 can have a flexible part 31 and optionally a rigid part 32 such as one or more rigid parts 32 that extend downstream and upstream from flexible part 31. Valve arrangement 50, when present, may include a or the above mentioned gate 51 that forms a compressing portion configured to compress flexible part 31 so as to control the flow of water 4 from the water source into chamber 21, such as a plurality of compressing portions 51, e.g. a pair of compressing portions 51, flexible part 31 extending between compressing portions 51 that are configured to squeeze therebetween the flexible part 31.

Water guide 30 may extend from the water source to beverage processing unit 10, 20 and may be arranged such that substantially all water 4 delivered into chamber 21 for preparing beverage 3 is guided by water guide 30.

The water source and water guide 30 may be thermally passive so as to deliver water 4 into chamber 21 unconditioned by any active thermal conditioner of such machine 1, e.g. any electric or combustion thermal conditioner. For instance, such machine 1 is free of any active thermal conditioner.

Water guide 30, and optionally the water source, can be configured such that water 4 is driven along water guide 30 into chamber 21 by gravity and/or capillary forces and/or gas pressure and/or depression, for instance only by gravity and/or capillary forces and/or gas pressure and/or depression. Water guide 30, and optionally the water source, may be free of any active liquid driver such as a pump, e.g. an electric or pneumatic pump.

Guide 30 may extend uprightly, such as substantially vertically, from processing unit 10, 20 to the water source, such as to a bottom part 41 of the water source, e.g. a or the above mentioned water tank 40.

Beverage processing unit 10, 20 can be configured such that, during beverage preparation, flavouring ingredient-containing capsule 2' (when present) and/or chamber 21 containing flavouring ingredient 2, is depressurized at least adjacent to an inlet 11 at an extremity of water guide 30 to draw water 4 from the water source via water guide 30 into capsule 2' (when present) and/or chamber 21. For instance, processing unit 10, 20 is configured to cause such depression by: modifying a volume of the capsule (when present) and/or of the chamber, e.g. expanding the volume; and/or centrifugally driving capsule 2' (when present) and/or chamber 21, e.g. about an axis 50' that intercepts or is collinear or is adjacent to inlet 11.

The water source may be configured to deliver water 4 under pressure into the water guide 30. For instance, water 4 is delivered under pressure of compressed gas, e.g. by connection of the abovementioned tank 40 to an air compressor and/or compressed gas reservoir, and/or under pressure of the above mentioned external water supply line.

Machine 1 may include a fluid module 15 that includes water guide 30 for guiding water 4 between the water source and chamber 21, fluid module 15 comprising first processing unit member 10 of processing unit 10, 20.

Such fluid module 15 may be assemblable by a user as a unit to the water source and to second processing unit member 20 and may be disassemblable by a user as a unit from the water source and from second processing unit member 20. Fluid module 15 may be assemblable to and disassemblable from the water source and second processing unit member 20 along an upright direction 71' of assembly and disassembly, such as a downward direction of assembly and an upward direction of disassembly of fluid module 15 to second processing unit member 20 and/or an upward direction of assembly and a downward direction of disassembly of fluid module 15 to the water source.

Such fluid module 15 and second processing unit member 20 can be disassemblably assembled together by at least one of a bayonet, screw-type, a hook-type, magnet-type, friction-type and latch-type connection 25, 17.

Fluid module 15, when present, may be mountable by a user as a unit to supporting structure 70 (when present) and removable by a user as a unit from such supporting structure. For instance, the water source is: mountable by a user as a unit to supporting structure 70 and removable by a user as a unit therefrom; and/or pluggable by a user to a or the above mentioned fluid connector 16 that is at an extremity of water guide 30 to fluidically connect the water source to water guide 30 and unpluggable by a user therefrom.

Fluid module 15, for instance with second processing unit member 20, can be configured to be driven in rotation by a or the abovementioned actuator typically a or the electric actuator, such as a or the (e.g. electric) motor 60, during beverage preparation so as to mix water 4 with flavouring ingredient 2 in chamber 21 e.g. by centrifugation, water guide 30 having at an extremity a or the above mentioned fluid connector 16 that is fluidically coupled to the water source via a seal 43. For instance, the water source is stationary during beverage preparation and the seal is either: angularly fixed to the water source and slidingly mounted to rotating fluid connector 16; or angularly fixed to the rotating fluid connector 16 and slidingly mounted to the water source; or slidingly mounted to rotating fluid connector 16 and slidingly mounted to the water source.

Fluid module 15 may include a or the above mentioned valve arrangement 50 for controlling, e.g. interrupting or allowing, a flow of water 4 along water guide 30, valve arrangement 50 being directly or indirectly rotatably mounted relative to the water source and driven in rotation at a rotational speed by the actuator to control the flow of water 4 along water guide 30.

Beverage processing unit 10, 20 may be disassemblable by a user from supporting structure 70 (when present) and assemblable by a user to supporting structure 70. Processing unit 10, 20 can be: assemblable to and disassemblable from supporting structure 70 as a unit; and/or assemblable to and disassemblable from supporting structure 70 along an upright direction 71' of assembly and disassembly, such as a downward direction of assembly and an upward direction of disassembly.

When present, fluid module 15, may be assemblable by a user as a unit to the water source and to second processing unit member 20 and may be disassemblable by a user as a unit from the water source and from second processing unit member 20.

Fluid module 15 and second processing unit member 20 can be assemblable to and disassemblable from supporting structure 70 as a unit.

Water guide 30 and first processing unit member 10 may be integrally formed and/or non-separable by a user.

When present, supporting structure 70 may include a connector 71, such as a loop-shaped, e.g. annular, connector, by which beverage processing unit 10, 20 is disassemblable by a user from supporting structure 70 and assemblable by a user to supporting structure 70. When assembled together, connector 71 and processing unit 10, 20 may be secured by at least one of squeezing, fastening, locking, latching, magnetic and/or elastic constraining, or clamping, e.g. by screw or bayonet assembly or by clamping ribs 26.

Such connector 71 can be rotatably mounted to base 72, e.g. via a bearing such as at least one of a sliding, magnetic, roller and ball bearing 73, connector 71 being driven by an actuator typically an electric actuator, such as a motor e.g. an electric motor 60, for instance via a transmission 611, 612, 62 such as gear 611, 612 and/or belt arrangement 62, to rotate beverage processing unit 10, 20 so as to prepare beverage 4 by centrifugation. Connector 71 and beverage processing unit 10, 20 may be rotatable about a or the above mentioned direction 71' of assembly and disassembly of connector 71 and processing unit 10, 20.

Machine 1 may include a beverage collector 80 for collecting beverage 3 from beverage processing unit 10, 20 during beverage preparation. Beverage collector 80 can have at least one collecting wall 81 directing beverage 3 out of collector 80 to a beverage dispensing area 90 typically via a beverage dispensing opening 82, e.g. a nozzle. Beverage dispensing area 90 may be located under beverage collector 80. Dispensing area 90 may be configured to receive a user-receptacle 100, such as a cup or a mug, in a position for collecting beverage 3 from collector 80.

Processing unit 10, 20 and/or such beverage collector can have a peripheral upright drainage wall 13 external to chamber 21 and extending at least partly about chamber 21 for collecting beverage 3 outside chamber 21 after beverage 3 has exited chamber 21 via the above mentioned or at least one outlet 12. Upright drainage wall 13 can be spaced apart from chamber outlet 12.

First processing unit member 10 may delimit the at least one chamber outlet 12. For instance, such at least one chamber outlet 12 can be formed by a gap between first and second processing unit members 10, 20 in the proximate configuration. For example, such at least one chamber outlet 12 comprises in a loop e.g. in a circle: an outlet forming a continuous passage extending along substantially an entire interface section between first and second processing unit members 10, 20 and/or a plurality of outlets 12 forming discrete spaced apart passages distributed along a or the above entire interface section between the first and second processing unit members 10, 20.

The above mentioned beverage collecting wall 81 may extend below a bottom part of drainage wall 13 and right underneath processing unit 10, 20 to collect beverage 3 when draining off from drainage wall 13 and to direct beverage 3 from collecting wall 81 out of collector 80. Chamber outlet 12 may be formed by and/or associated with a or the abovementioned one or more corresponding piercing elements 12' for piercing capsule 2' when present.

Beverage collector 80 can have an outlet opening, such as a or the above mentioned beverage dispensing opening 82, e.g. a nozzle, at a bottom of collecting wall 81 to direct beverage 3 from collecting wall 81 to beverage dispensing area 90 via the collector's outlet opening. For instance, the collector's outlet opening is right underneath beverage processing unit 10, 20 and/or extends along a central axis of the chamber 21 and/or of drainage wall 13 and/or of collecting wall 81.

Peripheral upright drainage wall 13 may extend downwardly substantially in a shape of at least one of a prism, cylinder, pyramid and cone and upright sections thereof.

Peripheral upright drainage wall 13 can form a closed loop about chamber 21 or an open loop extending about chamber 21 over an angle of at least 90 deg., such as of at least 180 deg., for instance at least 270 deg.

Collecting wall 81 may extend substantially shaped as a dish, such as substantially shaped as a cup or plate or bowl, with a or the above mentioned beverage dispensing opening 82, e.g. a nozzle, underneath processing unit 10, 20.

Collecting wall 81 can form a plurality of beverage guide channels 83, such as one or more channels 83 delimited by uprightly protruding beverage guide members 84, e.g. ribs, extending from a or the above mentioned beverage dispensing opening 82 towards peripheral upright drainage wall 13.

Collector 80 may be directly or indirectly user-reversibly assembled to support structure 70 along an upright direction 71' of assembly and disassembly, such as an upward direction of assembly and a downward direction of disassembly.

Collector 80 may be directly or indirectly user-reversibly assembled to support structure 70, e.g. to base 72, by:

a mechanical arrangement, such as at least one of a bayonet, screw-type, a hook-type, magnet-type, friction-type and latch-type arrangement; and/or a magnetic arrangement 75, 85, such as an arrangement comprising one or more field-generating elements 75 cooperating in mutual attraction for the user-reversibly assembly with one or more field-generating elements and/or with one or more ferromagnetic elements 85, for instance: the field-generating elements being selected from electromagnet elements and permanent magnet elements, e.g. made of at least one of iron, nickel, cobalt, rare earth metals, e.g. lanthanide, and alloys and oxides containing such metals as well as polymers (e.g. plastics) carrying such elements and components; and/or ferromagnetic element(s) 85 being made of at least one of Co, Fe, $Fe_2O_3$, $FeOFe_2O_3$, $NiOFe_2O_3$, $CuOFe_2O_3$, $MgO\,Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

For instance, support structure 70, when present, and collector 80 comprise each a discrete or continuous magnetic arrangement in mutual attraction for the user-reversibly assembly with a facing loop arrangements e.g. a circular arrangement, such as a discrete arrangement of field generating elements cooperating with a continuous or discrete arrangement of a ferromagnetic element.

At least part of the collector 80 may be made of transparent and/or translucide material such that beverage 3 inside collector 80 is user-visible from outside such machine 1, such as user-visible in daylight e.g. user-visible at an illuminance greater than 10, 100 or 1000 lux.

At least part of drainage wall 13 and/or at least part of beverage processing unit 10, 20, can be made of transparent and/or translucide material such that, when located behind such material, beverage 3 or flavouring ingredient 2 or, when present, capsule 2', is substantially user-visible from outside such machine 1, such as user-visible in daylight e.g. user-visible at an illuminance greater than 10, 100 or 1000 lux.

At least one of drainage wall 13, collecting wall 81 and guide channels 83 may be made of such transparent and/or translucide material.

When machine 1 has a or the abovementioned support structure 70, such as a frame, having a base 72 that is stationary during beverage preparation, processing unit 10, 20 may be rotatably mounted to support structure 70 about a processing unit axis 71'.

Machine 1 may have a or the above mentioned actuator, typically an electric actuator, supported by support structure 70, such as a motor e.g. an electric motor 60, that has a driving output member 61, e.g. an output shaft, rotating about an output axis 61'. Output member 61 can be coupled to processing unit 10, 20 for driving processing unit 10, 20 in rotation to centrifugally drive flavouring ingredient 2 with water 4 in chamber 21.

The output member 61 of the actuator may be coupled to the processing unit 10, 20 by a or the above mentioned transmission 611, 612, 62 such that output axis 61' is off-set, e.g. substantially parallel, or angled-away, e.g. by an angle between 60 and 120 deg. such as between 85 and 90 deg., relative to processing unit axis 71'.

The actuator may be located outside vertical confines of an outermost perimeter of processing unit 10, 20. Output axis 61' and processing unit axis 71' can be spaced by a minimum distance of at least 4 cm, such as in the range of 5 to 25 cm, e.g. 6 to 15 cm.

Transmission 611, 612, 62 may include at least one of: gears 611, 612, e.g. spur-gear; belts, e.g. toothed belts 62, and optionally idler pulleys 612; connecting rods; and magnetic couplers.

Base 72 can have a main outside housing 72' confining the actuator, beverage processing unit 10, 20 being located externally to main outside housing 72' such that the actuator is substantially shielded by main outside housing 72' from beverage processing unit 10, 20 and from beverage 3 during beverage preparation. Transmission 611, 612, 62 may extend through a transmission opening 72'', such as a side opening e.g. a window, of main outside housing 72' to couple processing unit 10, 20 and output member 61.

Main outside housing 72' can be of substantially prismatic, cylindrical, conical and/or pyramidal upright shape.

The water source and water guide 30 can be located externally to the main outside housing 72' such that the actuator is substantially shielded from water 4.

Base 72 can have a stationary support 72''' for a fluid line 34 adjacent to main outside housing 72' at transmission opening 72''. Typically, fluid line 34 extends from the water source to a of the above mentioned beverage dispensing opening 82 via chamber 21.

For example, fluid line support 72''' is integral with or fixed to main outside housing 72'. Stationary fluid line support 72''' can be configured to assemble processing unit 10, 20 to base 72. Stationary fluid line support 72''' can be configured to assemble the water source and water guide 30 to base 72.

Base 72 may include a connector 71, such as a loop-shaped, e.g. annular, connector, by which beverage processing unit 10, 20 is mounted to base 72. For instance, processing unit 10, 20 is disassemblable by a user from base 72 and assemblable by a user to base 72. When assembled together, connector 71 and processing unit 10, 20 can be secured by at least one of squeezing, fastening, locking, latching, magnetic and/or elastic constraining, or clamping, e.g. by screw or bayonet assembly or by clamping ribs 26.

Machine 1 may include one or more electric devices 60, 65, 721, such as at least one of an actuator 60, a control device 65 and a user-interface 721.

Machine 1 may have a connection 76 to an electric supply, such as an electric cord or an electric connector. Connection 76 can be configured to extend from outside to inside main outside housing 72' to power only such electric devices 60, 65, 721 that are confined in main outside housing 72' and/or that are mounted in a panel of main outside housing 72', such as a user-interface 721.

Machine 1 may have a or the above mentioned support structure 70, such as a frame, having a base 72 that comprises a main outside housing 72', a fluid line support 72''' and a supporting foot 72$^{IV}$ at a bottom of main outside housing 72'. Main outside housing 72' can be stationary during beverage preparation. Processing unit 10, 20 and water guide 30, and optionally water source, may be supported by base 72. Foot 72$^{IV}$ can be configured to rest on an external substantially horizontal surface, such as a table top or a shelf, during beverage preparation.

All electric device(s) 60, 65, 721 of machine 1, e.g. the above mentioned device(s) 60, 65, 721, may be confined in and/or comprised in main outside housing 72' and/or foot 72$^{Iv}$.

Beverage processing unit 10, 20, the water source and water guide 30 may be located entirely outside main outside housing 72' and outside foot 72$^{Iv}$.

The water source and water guide 30 may be located externally to main outside housing 72' such that electric device(s) 60, 65, 721 is/are substantially shielded from water 4.

Machine 1 may include a or the above mentioned valve arrangement 50 located entirely outside main outside housing 72' and outside foot 72$^{Iv}$. Water guide 30 and valve arrangement 50 can be arranged such as to fluidically connect the water source and beverage processing unit 10, 20 and to control, e.g. to interrupt or to allow, the flow of water 4 from the water source into chamber 21.

As mentioned above, valve arrangement 50 can be directly or indirectly rotatably mounted to support structure 70 and driven in rotation at a rotational speed by the actuator to control the flow of water 4 along water guide 30.

Foot 72$^{IV}$ may be located right below a beverage dispensing area 90 configured to receive a user-receptacle 100, such as a cup or a mug, in a position for collecting beverage 3 from processing unit 10, 20. For instance, foot 72$^{IV}$ delimits and forms a placement surface for supporting such user-receptacle 100 in dispensing area 90. Such machine 1, when free of flavouring ingredient 2 and water 4, may have a weight ratio of foot 72$^{Iv}$ over machine 1 in the range of 0.33 to 0.85 such as 0.5 to 0.66.

Main outside housing 72' can extend in an upright manner from foot 72$^{IV}$, fluid line support 72''' being located at an upper part, e.g. at a top, of main outside housing 72' to hold beverage processing unit 10, 20 right above foot 72$^{IV}$, such that support structure 70 is substantially L-shaped or C-shaped or inverted Q-shaped when oriented to prepare beverage 3.

Main outside housing 72' can have a gripping surface 722, e.g. a textured or striated or corrugated or undulated or ruled or even surface, to facilitate hand gripping, extending between foot 72$^{IV}$ and fluid line support 72''' for seizing support structure 70 single-handed such that support structure 70 with processing unit 10, 20 and water guide 30, and optionally the water source, can be carried and displaced single-handed by seizure of gripping surface 722.

Gripping surface 722 may extend over: a height of at least 3 cm, such as at least 6 cm, for instance in the range of 7 to 25 cm, e.g. 8 to 20 cm, for example 9 to 15 cm; and/or a portion, such as a portion of at least 50% for instance at least 66% e.g. in the range of 75 to 100%, of a horizontal outside perimeter of main outside housing 72', the perimeter having a length in the range 3 to 30 cm, such as 5 to 25 cm, e.g. 7 to 20 cm, for instance 9 to 16 cm, for example 11 to 14 cm. Gripping surface 722 may extend over such portion over at least 66%, such as at least 75 e.g. at least 85% for instance in the range of 90 to 100%, of a or the above mentioned height of gripping surface 722.

One of processing unit members 10, 20 can be provided with a cavity delimiting chamber 21, first and second processing unit members 10, 20 in their distant configuration being configured for direct manual insertion into, and optionally direct manual removal out of, the cavity of flavouring ingredient 2, optionally within the abovementioned capsule 2'. The cavity-provided unit member 20 may be configured to be able to be oriented upward for insertion of flavouring ingredient 2 into the cavity and to be oriented downward for removal of the flavouring ingredient 2 out of the cavity, e.g. with the aid of gravity.

The water source, e.g. a or the above mentioned water supply tank 40, can be configured to contain a limited amount of water 4 that corresponds to a maximum amount needed for a serving. Machine 1 can be configured to deliver all water 4 contained in the water source for preparing a serving of beverage 3. The limited amount of water 4 may be in the range of 200 to 1000 ml, such as 350 to 750 ml. The water source may have an indication arrangement, such as a marking system on the abovementioned water supply tank 40, to indicate different levels of water amounts below the maximum amount corresponding to different types of beverage servings.

Machine 1 can be configured to prepare beverage 3: without thermally conditioning water 4 delivered from the water source into chamber 21, for instance machine 1 being free of activatable thermal conditioner or having a beverage preparation mode in which a thermal conditioner of the machine is bypassed or inactivated; or with thermally conditioning the water delivered from the water source into the chamber, for instance the machine having an activatable thermal conditioner such as a water heater and/or cooler.

Machine 1 may be configured to deliver beverage 3 at a temperature below 30° C. such as below 25° C., for instance in the range of 3 to 20° C., for example in the range of 5 to 15° C., e.g. 7 to 10° C.

Machine 1 can be configured to deliver water 4 from the water source into chamber 21 at an average rate for a beverage serving in the range of 10 to 300 ml/min, for instance 20 to 100 ml/min, such as 40 to 80 ml/min.

Beverage processing unit 10, 20 can be arranged in order to rotate the chamber 21 at a speed in the range of 500 to 10000 RPM, such as 1250 to 7500 RPM, for centrifugation of water 4 with flavouring ingredient 2, optionally within capsule 2' to prepare beverage 3.

The invention claimed is:

1. A machine for preparing a beverage from a flavouring ingredient by mixing water with the flavouring ingredient, the machine comprising:

a beverage processing unit formed of a first processing unit member and a second processing unit member that delimit a chamber and that are movable between a distant configuration in which the flavouring ingredient is received in the chamber and a proximate configuration in which the flavouring ingredient is held and mixed with the water in the chamber during beverage preparation;

a water source for delivering the water towards the beverage processing unit formed by a connector to be connected to a water supply line external to the machine and/or a water supply tank that has an outside opening for water filling with a water source external to the machine;

a fluid module comprising a water guide for guiding the water between the water source and the chamber, the fluid module comprising the first processing unit member of the processing unit; and a supporting structure which has a base that is stationary during beverage preparation, the fluid module being mountable by a user as a unit to the supporting structure and removable by a user as a unit from the supporting structure;

wherein the fluid module is assemblable by a user as a unit to the water source and to the second processing unit member and is disassemblable by a user as a unit from the water source and from the second processing unit member.

2. The machine of claim 1, wherein the fluid module and the second processing unit member are disassemblably assembled together by at least one of a bayonet, screw-type, a hook-type, magnet-type, friction-type and latch-type connection.

3. The machine of claim 1, wherein the fluid module is configured to be driven in rotation by an actuator typically an electric actuator during beverage preparation so as to mix the water with the flavouring ingredient in the chamber.

4. The machine of claim 1, wherein the fluid module comprises a valve arrangement for controlling a flow of the water along the water guide.

5. The machine of claim 4, wherein the valve arrangement is directly or indirectly rotatably mounted relative to the water source and driven in rotation at a rotational speed by an actuator to control the flow of the water along the water guide.

6. The machine of claim 1, wherein one of the first processing unit member and the second processing unit member is provided with a cavity delimiting the chamber, the first and second processing unit members in their distant configuration being configured for direct manual insertion into the cavity.

7. The machine of claim 1, wherein the water source is configured to contain a limited amount of the water that corresponds to a maximum amount needed for a serving.

8. The machine of claim 1, which is configured to prepare the beverage: without thermally conditioning the water delivered from the water source into the chamber.

9. The machine of claim 1, which is configured to deliver the beverage at a temperature below 30° C.

10. The machine of claim 1, which is configured to deliver the water from the water source into the chamber at an average rate for a beverage serving in the range of 10 to 300 ml/min.

11. The machine of claim 1, wherein the beverage processing unit is arranged in order to rotate the chamber at a speed in the range of 500 to 10000 RPM to prepare the beverage.

12. The machine of claim 1, wherein the water guide is free of a water pump.

13. The machine of claim 1, wherein the fluid module is assemblable to and disassemblable from the water source and the second processing unit member along an upright direction of assembly and disassembly.

14. The machine of claim 13, wherein the upright direction comprises a downward direction of assembly and an upward direction of disassembly of the fluid module to the second processing unit member and/or an upward direction of assembly and a downward direction of disassembly of the fluid module to the water source.

15. A combination of:
a machine for preparing a beverage from a flavouring ingredient by mixing water with the flavouring ingredient, the machine comprising:
a beverage processing unit formed of a first processing unit member and a second processing unit member that delimit a chamber and that are movable between a distant configuration in which the flavouring ingredient is received in the chamber and a proximate configuration in which the flavouring ingredient is held and mixed with the water in the chamber during beverage preparation;
a water source for delivering the water towards the beverage processing unit formed by a connector to be connected to a water supply line external to the machine and/or a water supply tank that has an outside opening for water filling with a water source external to the machine;
a fluid module comprising a water guide for guiding the water between the water source and the chamber, the fluid module comprising the first processing unit member of the processing unit; and
a supporting structure which has a base that is stationary during beverage preparation, the fluid module being mountable by a user as a unit to the supporting structure and removable by a user as a unit from the supporting structure;
wherein the fluid module is assemblable by a user as a unit to the water source and to the second processing unit member and is disassemblable by a user as a unit from the water source and from the second processing unit member; and
a flavouring ingredient for preparing the beverage from the flavouring ingredient in the machine.

16. The combination of claim 15, wherein the water guide is free of a water pump.

17. The combination of claim 15, wherein the fluid module is assemblable to and disassemblable from the water source and the second processing unit member along an upright direction of assembly and disassembly.

18. The combination of claim 17, wherein the upright direction comprises a downward direction of assembly and an upward direction of disassembly of the fluid module to the second processing unit member and/or an upward direction of assembly and a downward direction of disassembly of the fluid module to the water source.

* * * * *